United States Patent
Messina (10) Patent No.: US 6,792,369 B2
(45) Date of Patent: Sep. 14, 2004

(54) SYSTEM AND METHOD FOR AUTOMATICALLY CALIBRATING AN ALIGNMENT REFERENCE SOURCE

(75) Inventor: Peter V. Messina, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 154 days.

(21) Appl. No.: 10/215,578

(22) Filed: Aug. 9, 2002

(65) Prior Publication Data

US 2004/0030519 A1 Feb. 12, 2004

(51) Int. Cl.⁷ .......................... G01C 17/38; G01P 21/00
(52) U.S. Cl. ...................................................... 702/94
(58) Field of Search .................. 702/40, 94, 150–153; 250/201.2, 201.9, 559.29, 559.3; 356/138, 146, 253, 341

(56) References Cited

U.S. PATENT DOCUMENTS

| | | | |
|---|---|---|---|
| 5,166,745 A | | 11/1992 | Johnson |
| 6,020,955 A | * | 2/2000 | Messina ...................... 356/138 |
| 6,288,381 B1 | * | 9/2001 | Messina .................. 250/201.1 |

* cited by examiner

Primary Examiner—Michael Nghiem
(74) Attorney, Agent, or Firm—John E. Gunther; Leonard A. Alkov; William C. Schubert (57) ABSTRACT

A system (10, 12, 34) for calibrating an apparatus (10) for aligning components (20) relative to a desired line of sight. The system includes a first mechanism (70) for generating a command designed to move a line-of-sight of one of the components (20) to a first position, the line-of-sight moving to a second position in response thereto. A second mechanism (36, 38, 74, 78) automatically compensates for a variation between the first position and the second position via a scale factor (78).

18 Claims, 4 Drawing Sheets

SYSTEM AND METHOD FOR AUTOMATICALLY CALIBRATING AN ALIGNMENT REFERENCE SOURCE

BACKGROUND OF THE INVENTION

1. Field of Invention

This invention relates to alignment systems. Specifically, the present invention relates to systems and methods for calibrating reference sources and accompanying reference source steering mechanisms in systems for aligning sensors or transmitters to desired optical paths.

2. Description of the Related Art

Alignment systems are employed in various demanding applications including imaging, chemical analysis, and military targeting, surveillance, and reconnaissance systems. Such applications require alignment systems that can accurately and efficiently align components, such as optics, along a desired line-of-sight. These applications often require precise alignment of multiple constituent sensor components to ensure accurate handover of sensing function from one sensor to another or to facilitate multi-sensor data integration or fusion.

Precise system component alignment is particularly important in multi-spectral electro-optical systems employing multiple sensors sharing a common aperture. An exemplary electro-optical sensor suite includes a laser transceiver, a visible camera, and an infrared imager. The laser transceiver transmits a laser beam toward a scene. The scene reflects the beam, which is detected by the transceiver. The transceiver includes electronics and may include software to measure the round trip delay between transmission and reception of the beam and thereby determine the distance to a specific location within the scene, which may be a target.

The infrared imager detects thermal energy emanating from the scene. Electronics within the infrared imager convert received thermal energy into an image. Similarly, the visible camera receives visible-band electromagnetic energy reflected from the scene and generates a corresponding image. The infrared and visible images may be combined with laser range information to facilitate targeting or sensing. Generally, the center of the received reflected laser beam should coincide with the center or aimpoint of the infrared and visible images for accurate targeting.

Accurate and efficient alignment systems are particularly important in missile and aircraft sensor suites, where excess shock and vibration may exacerbate alignment problems. A sensor suite may include one or more reference sources rigidly attached and aligned to sensor suite components, such as detector arrays and lasers requiring alignment to a predetermined line-of-sight. In the exemplary sensor suite, the range finding laser requires alignment with a passive sensor, such as the visible or infrared sensor. A first reference source is rigidly aligned to the range finding laser and transmits a beam that is coincident with the transmitted laser beam. A beam splitter directs the first reference source beam onto the surface of a photodetector. A second reference source is rigidly aligned to the optical axis of the passive sensor and transmits a second reference beam coincident with the optical axis of the passive sensor. The second reference beam is also directed to the photodetector via the beam splitter. The laser is aligned with the passive sensor by aligning the dot caused by the first reference source with the dot caused by the second reference source on the surface of the photodetector. The reference dots are often aligned to the center or null position on the photodetector.

One or more steering mirrors are often placed in the optical path of one or more of the sensor suite components, such as detectors or lasers, requiring alignment. The mirrors are controlled by alignment loops, which adjust the angle of each mirror to align the lines-of-sight of sensor suite components.

To accurately align sensor suite components, a command sent to an alignment mirror to move the mirror a predetermined amount in a predetermined direction must accurately move the mirror by that predetermined amount and in that predetermined direction. In addition, the reference spot on the surface of the photodetector should move by the desired amount in relation to the angular movement of the mirror. To achieve this, alignment systems often require so-called reference source calibration.

The movement of a reference spot on the surface of a photodetector is proportional to the angular movement of the steering mirror. The proportionality constant is a scaling factor that includes photodetector sensitivity, optical reference beam intensity, and reference beam diameter, which are unique to each photodetector and reference source. Consequently, each combination of photodetector and reference source has a unique scaling factor describing the relationship between reference spot motion on the surface of the detector and angular movement of the steering mirror. Scaling factor accuracy requirements are higher than manufacturing build-up tolerances. Consequently, this scaling factor is conventionally determined through reference source calibration after assembly of the accompanying sensor suite.

The measured or commanded reference source positions (spots) on the photodetector must be accurate and must be calibrated for optimal component alignment, which is especially important in applications requiring off-center line-of-sight positions (peripheral positions) which are displaced relative to the center of the photodetector. In a non-calibrated system, a command to move a reference spot by certain angle may cause the reference spot to move by a different angle. In a calibrated system, calibration scale factors are applied to cancel this difference so that the reference spots move as commanded.

Conventionally, reference sources are calibrated manually. An alignment system is tested during manufacture or in the laboratory with specialized equipment to determine the correct calibration scale factors to apply to the position commands for steering the mirrors to achieve desired movement characteristics of a given reference spot on the surface of a photodetector. However, manual calibration is often undesirably time-consuming and expensive. Manual calibration in the field is particularly problematic.

Shock and vibration during missile or aircraft maneuvers may cause sensor suite components to shift or malfunction. Certain sensors and reference sources may require replacement. When components are interchanged or replaced, the reference source calibration scale factors must be adjusted manually via factory calibration equipment. Conventionally, this requires that the sensor suite be shipped back to the factory, which is inefficient, expensive, and time-consuming.

Hence, a need exists in the art for an efficient and accurate system for calibrating reference sources that does not require scarcely available factory equipment. There exists a further need for an efficient sensor component alignment system that incorporates the efficient system for calibrating reference sources.

SUMMARY OF THE INVENTION

The need in the art is addressed by the system for calibrating an apparatus for aligning components relative to a desired path of the present invention. In the illustrative embodiment, the inventive system is adapted for use with a sensor suite. The system includes first mechanism for generating a command designed to move a line-of-sight of one of the components to a first position, the line-of-sight moving to a second position in response thereto. A second mechanism automatically compensates for a variation between the first position and the second position via a scale factor.

In a more specific embodiment, the system further includes a third mechanism for adjusting the command via the scale factor so that the second position matches the first position. The line-of-sight is coincident with a first reference beam. The command corresponds to a mirror drive signal that controls a steering mirror positioned to selectively alter the line-of-sight.

The components are sensor system components and include one or more electromagnetic energy transmitters, receivers, and/or sensors. The second mechanism includes a photodetector. The steering mirror is responsive to the command and is positioned to direct the first reference beam onto the photodetector, thereby creating a reference spot corresponding to the reference beam on the surface of the photodetector.

The second mechanism includes a processor that communicates with the steering mirror and receives output from the photodetector. The processor runs software for generating the command and measuring the first position and the second position of the reference beam by measuring corresponding positions of the reference spot on the surface of the photodetector. The software receives input from an image tracker that communicates with an imaging sensor. The imaging sensor is rigidly aligned to the reference source and aimed at a calibration target. The input received by the processor from the image tracker represents a change in angular position of an image of the target in response to the command.

The software includes a module that adjusts the scale factor based on the variation in angular position of the image. The variation corresponds to a difference in angular position between the first position and second position. The module for adjusting scale factor implements the following equation:

$$(K \text{ Cal Error Comp})_t = (K \text{ Cal Error Comp})_{t-1} (\Delta_{X,Y\ t}/\theta_{CDP}),$$

where $(K \text{ Cal Error Comp})_t$ is the scale factor at time t; $(K \text{ Cal Error Comp})_{t-1}$ is the previous scale factor at time t−1; $\Delta_{X,Y\ t}/\theta_{CDP}$ is a scale factor correction term based on the variation in angular position, where $\Delta_{X,Y\ t}$ is the difference between a null position and a resulting position of a line-of-sight of a sensor corresponding to the second position; and $\theta_{CDP}$ represents the command corresponding to the first position.

In an illustrative embodiment, the components to be aligned to the desired line-of-sight include an active sensor employing a laser beam or other beam of electromagnetic energy. The components also include a first reference source for providing the first reference beam and a second reference source for providing a second reference beam. The first reference beam is aligned to a first component, and the second reference aligned to a second component. The steering mirror is a common steering mirror that is positioned in the path of both the first reference beam and the second reference beam. The common steering mirror directs the first reference beam and the second reference beam onto the surface of the photodetector.

The software includes a module that determines calibration scale factors for the first reference source to yield a calibrated reference source in response thereto. The module for determining calibration scale factors employs the calibrated reference source to determine calibration scale factors associated with the second reference source. The second reference source has an additional steering mirror in its line-of-sight.

The novel design of the present invention is facilitated by the second mechanism, which automatically determines the scale factor that enables accurate auto-alignment commands that match actual changes in the lines-of-sights of components to be aligned. Automatically determining required calibration scale factors obviates tedious manual calibration. Consequently, certain sensors may be replaced in the field, which saves costly downtime.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
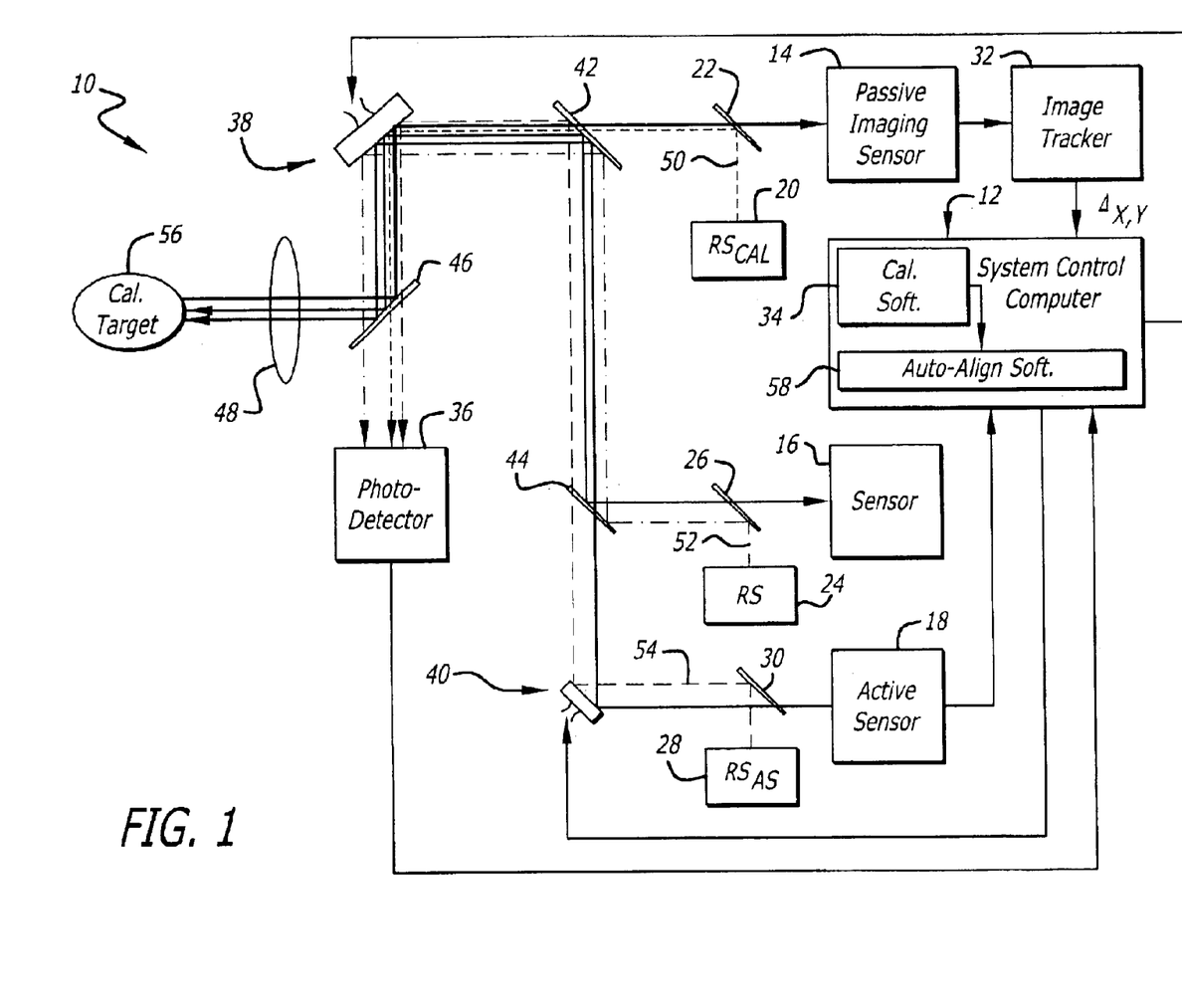
FIG. 1 is a diagram of a sensor suite employing an automatic reference source calibration system and accompanying component alignment system constructed in accordance with the teachings of the present invention.

FIG. 1 is a diagram of a sensor suite 10 employing an automatic reference source calibration system, which includes a system control computer 12 (also called a system control processor), and is constructed in accordance with the teachings of the present invention. For clarity, various well-known components, such as power supplies, focusing lenses, clocking circuits, amplifiers, nonuniformity correction modules, and so on, have been omitted from the figures, however those skilled in the art with access to the present teachings will know which components to implement and how to implement them to meet the needs of a given application.

The sensor suite 10 includes a first passive imaging sensor 14, a second passive sensor 16, and an active sensor 18. A first reference source 20, which is also called the calibration optical reference source, is rigidly aligned to the line-of-sight of the first passive imaging sensor 14. A first beam-splitter 22 is positioned between the output of the first reference source 20 and the input of the first passive imaging sensor 14 so that a first reference beam 50 output by the first reference source 20 is aligned with the line-of-sight of the first passive imaging sensor 14.

A second reference source 24 is rigidly aligned to the second passive sensor 16. A second beam splitter 26 is positioned between the output of the second reference source 24 and the input of the second passive sensor 16 and operates analogously to the first beam splitter 22.

A third reference source 28, which is also called the active reference source, is rigidly aligned with the active sensor 18. A third beamsplitter 30 is positioned between the output of the third reference source 28 and the output of the active sensor 18 so that a third reference beam 54 output by the third reference source 28 is aligned with a beam output from the active sensor 18. The path of the beam output from the active sensor corresponds to the line-of-sight of the active sensor 18.

The passive imaging sensor 14 is connected in an image tracker 32 that can track the motion of objects within the field of view of the passive imaging sensor 14. The image tracker 32 provides output to a system control computer 12 that runs reference source calibration software 34 that is constructed in accordance with the teachings of the present invention. The system control computer 12 also receives input from the second passive sensor 16, the active sensor 18, and a photodetector 36 and provides control output to a common steering mirror 38 and to a dedicated independent steering mirror 40.

The common mirror 38 is positioned in the optical paths corresponding to the lines-of-sight of the reference sources 20, 24, 28 and corresponding sensors 14, 16, 18. The independent steering mirror 40 is in the optical path of the third reference beam 54 output by the active reference source 28, which corresponds to the line-of-sight of the active sensor 18.

A fourth beamsplitter 42 is positioned in the optical paths of the reference sources 20, 24, 28 and directs some incoming electromagnetic energy to the first passive imaging sensor 14 via the first beam splitter 22. The fourth beam splitter 42 also directs some incoming energy to the second passive sensor 16 via a fifth beam splitter 44 and the second beam splitter 26.

The first reference source 20, the second reference source 24, and the third active reference source 28 output the first reference beam 50, the second reference beam 52, and the third reference beam 54, respectively. The reference beams 50–54 are beams of electromagnetic energy that are detectable by the photodetector 36. The reference beams 50–54 are coincident with the lines-of-sight of their respective sensors 14–18.

The third reference beam 54 output by the active reference source 28 is directed to the surface of the photodetector 36 via the third beamsplitter 30, the independent steering mirror 40, the fifth beam splitter 44, the fourth beam splitter, the common steering mirror 38, and a sixth beam splitter 46. The sixth beam splitter 46 is positioned between the common steering mirror 38, the photodetector 36, and a common aperture 48 at the output of the sensor suite 10. The third reference beam 54 is coincident with the line-of-sight of the active sensor 18 until some of the reference beam is diverted to the photodetector 36 via the sixth beam splitter 46. The third reference beam 54 facilitates aligning the line-of-sight of the active sensor 18 with the lines-of-sight other sensors 14, 16 in the sensor suite 10.

The second reference beam 52 is directed to the photodetector 36 via the second beamsplitter 26, the fifth beam splitter 44, the fourth beam splitter 42, the common steering mirror 38, and the sixth beam splitter 46. The second reference beam 52 is coincident with the line-of-sight of the second passive sensor 16 until some of the reference beam is diverted to the photodetector 36 via the sixth beam splitter 46. The second reference beam 52 facilitates aligning the line-of-sight of the second passive sensor 16 with the lines-of-sight of the other sensors 14, 18 in the sensor suite 10. The first reference beam 50 is directed to the photodetector 36 via the first beam splitter 22, the fourth beam splitter 42, the common steering mirror 38, and the sixth beam splitter 46.

In operation, calibration scale factors are employed by auto-alignment software 58 running on the system control computer 12 to generate accurate auto-alignment commands, which selectively steer the mirrors 38, 40 to adjust the lines-of-sight of the sensors 14–18. The sensors 14–18 are aligned to a desired line-of-sight via the steering mirrors 38, 40 and the auto-alignment software 58 running on the system control computer 12. In many applications, the lines-of-sight of the sensors 14–18 are aligned to a common line-of-sight, which is aligned with the center or null point on the surface of the photodetector 36. In other applications, the desired line-of-sight is off-center to facilitate fine pointing or stabilization of the line-of-sight. Those skilled in the art will appreciate that the lines-of-sight of the sensors 14–18 do not necessarily require alignment to a common line-of-sight and that alignment requirements may vary depending on the application.

To align the line-of-sight of the first passive imaging sensor 14 with the null of the photodetector 36, the system control computer 12 commands the common steering mirror 38 to move a spot created by the first calibration reference source 20 on the photodetector 36 to the center of the photodetector 36. Feedback from the photodetector 36 enables the system control computer 12 to determine when the spot caused by the first reference beam 50 on the surface of the photodetector 36 is centered on the surface of the photodetector 36 and make adjustments in response thereto. For the purposes of the present discussion, a sensor is aligned when its line-of-sight coincides with a desired line-of-sight.

Without accurate calibration scale factors, a command sent to the common steering mirror 38 to move the spot caused by the first reference beam 50 on the surface of the photodetector 36 by a predetermined amount may cause the spot to move by a different amount. Calibration is required to ensure the accuracy of auto-alignment commands sent to the steering mirrors 38, 40 from the system control computer 12.

The method for aligning the line-of-sight of the second passive sensor 16 is analogous to the method for aligning the first passive imaging sensor 14. In the sensor suite 10, the first passive imaging sensor 14 and the second passive sensor 16 are aligned at different times. The first sensor 14 or the second sensor 16 is aligned before the second sensor 16 or the first sensor 14 is aligned, respectively.

The active sensor 18 has the additional steering mirror 40 in its optical path, which provides an additional degree of freedom, allowing the auto-alignment software 58 to simultaneously align the first passive imaging sensor 14 or the second passive sensor 16 with the active sensor 18. To perform simultaneous alignment of the active sensor 18 with the first sensor 14 or the second sensor 16, the system control computer 12 must be able to distinguish between spots on the photodetector 36 caused by the first reference beam 50 or the second reference beam 52, and the third reference beam 54 associated with the active sensor 18.

Methods for discriminating between reference sources include time-multiplexing and frequency multiplexing. In the present specific embodiment, the active reference source 28 is time-multiplexed with either the first calibration reference source 20 or the second reference source 24. Those skilled in the art will appreciate that the active sensor 18 may be aligned independently, wherein the third reference source 54 is not time-multiplexed with the other sources 20, 24, without departing from the scope of the present invention.

Before the sensors 14–18 are auto-aligned, the sensor suite 10 calibrates the reference sources 20, 24, 28 via the calibration software 34 so that the system control computer 12 can accurately align the line lines-of-sight of the sensors 14–18 via control signals sent to the steering mirrors 38, 40. Reference source calibration involves determining unique scale factors associated with the photodetector 36, the reference beams 50–54, and the mirrors 38 and 40. The commanded motion of each spot caused by the reference beams 50–54 on the surface of the photodetector 36 is proportional to the actual measured motion. The proportionality constant incorporates the scale factors.

To facilitate reference source calibration, the sensor suite 10 is initially aimed at a calibration target 56, which is a stable target that is sufficiently illuminated, either passively or actively, to enable clear detection by the sensors 14–18. Initially, one of the passive sensors 20, 24 is calibrated first and then used to calibrate the remaining sensors. For the purposes of the present discussion, the sensor that is calibrated first is called the calibration optical reference source and is the first reference source 20.

Initially, the calibration software 34 forwards a null command (Cal Null$_{X,Y}$) to the common steering mirror 38 intended to center spot caused by the first reference beam 50 on the surface of the photodetector 36. Since the first reference source 20 is not yet calibrated, the resulting spot may be off null.

Subsequently, the calibration software 34 generates a calibration command (Calibration Desired Position Command ($\theta_{CDP}$)) intended to move the spot caused by the first reference beam 50 by a predetermined angular distance across the surface of the photodetector 36 to a desired position (Calibration Desired Position (CDP)). The angular distance that the spot actually moves on the surface of the photodetector 36 is proportional to the angular movement ($\theta_M$) of the common steering mirror 38.

The image tracker 32 then measures the corresponding angular movement ($\Delta_{X,Y}$) of the image of the calibration target 56 across the surface of the passive imaging sensor 14 and then forwards the measured movement ($\Delta_{X,Y}$) to the calibration software running on the system control computer 12. If the measured movement $\Delta_{X,Y}$ is greater than the commanded movement $\theta_{CDP}$, then the mirror drive signal generated in response to the commanded movement $\theta_{CDP}$ is reduced. Similarly, if the measured movement $\Delta_{X,Y}$ is less than the commanded movement $\theta_{CDP}$, then the mirror drive signal generated by the calibration software 34 in response to the commanded movement $\theta_{CDP}$ is increased. The mirror drive signal is incrementally increased or decreased, via adjustments to a scale factor, until the measured movement $\Delta_{X,Y}$ as output by the image tracker 32 is approximately equal to the commanded movement $\theta_{CDP}$. The scale factors are then saved by the calibration software 34 and used by the auto-alignment software 58 to generate commands to accurately control the common steering mirror 38 to facilitate auto-alignment. The scale factor may also be employed to calibrate the remaining sensors 24, 28 as discussed more fully below.

Those skilled in the art will appreciate that the calibration software 34 may be implemented in hardware without departing from the scope of the present invention. Furthermore, various modules required to implement the present invention, such as imaging sensors, reference sources, lasers, image trackers, photodetectors, and auto-alignment loops are known in the art and readily available. The calibration software 34 may be constructed by one skilled in the art with access to the present teachings and adapted for a particular application without undue experimentation. In addition, the image tracker 32 may be replaced with another mechanism that can accurately measure image motion on the surface of the passive imaging sensor 14.

The reference sources 20, 24, 28 are rigidly aligned to the lines-of-sight of their respective sensors 14–18. Consequently, the corresponding reference beams 50–54 facilitate measurement of the line-of-sight angular positions of the corresponding sensors 14–18. The reference beams 50–54 may be nulled on the surface of the common photodetector 36 to align the lines-of-sight of all of the sensors 14–18 to a common line-of-sight.

In some applications, the lines-of-sight of the sensors 14–18 are steered by the same angular amount to facilitate fine pointing or stabilization of the common line-of-sight. In this case, the reference beams 50–54 are steered off the photodetector center null by a predetermined amount, which steers the common sensor line-of-sight by the same amount. This application requires that the measured positions of the spots caused by the reference beams 50–54 on the surface of the photodetector 36 be accurately calibrated.

Since the first passive imaging sensor 14 and the second sensor 16 have a common steering mirror in their lines-of-sight, only one of them may be actively aligning at any one time. Consequently, when the second sensor optical reference source 24 is enabled or activated, the first reference source 20 is disabled or deactivated. The second sensor 16 may be an active sensor and/or a laser without departing from the scope of the present invention.

The third sensor 28 is an active sensor with the corresponding optical reference source 28 and the dedicated steering mirror 40 and the common steering mirror 38 in its optical path to the photodetector 36. The active sensor optical reference source 28 is time-multiplexed with either the first reference source 20 or the second reference source 24, which enables the active alignment of two sensors, such as the active sensor 18 and the imaging sensor 14 or the active sensor 18 and the second sensor 16, simultaneously on the photodetector 36.

In the present embodiment, automatic scale factor calibration of multiple sensor optical reference sources 20, 24, 28 requires that the sensor suite 10 has a common auto-alignment steering mirror in the optical paths of the reference sources 20, 24, 28. In a multiple optical reference source system, one optical reference source is defined as the calibration optical reference source, which is calibrated first and then used as the reference for the automatic calibration of the other optical reference sources. In the present embodiment, the first reference source 20 is the calibration optical reference source.

Calibration of the calibration optical reference source 20 is required to establish a reference for the multiple sensor optical reference source calibration. This initial calibration requires that the sensor suite 10 incorporates the use of an imaging sensor, such as the first sensor 14, and a means to measure image motion, such as the image tracker 32. The calibration image resulting from the calibration target 56 must have sufficient signal intensity to noise ratio and minimum background clutter to provide accurate tracker angle measurements ($\Delta_{X,Y}$). Automatic multiple reference source calibration may be used during manufacturing, in the field, or at a repair center to reduce costs associated with system calibration and to enhance system availability.

The auto-alignment software 58 incorporates auto-alignment loops for each optical reference source 20, 24, 28, which each share the common photodetector 36. Each auto-alignment loop incorporates steering mirror 38 and/or 40 to enable the active closed-loop auto-alignment function.

Figure 2:
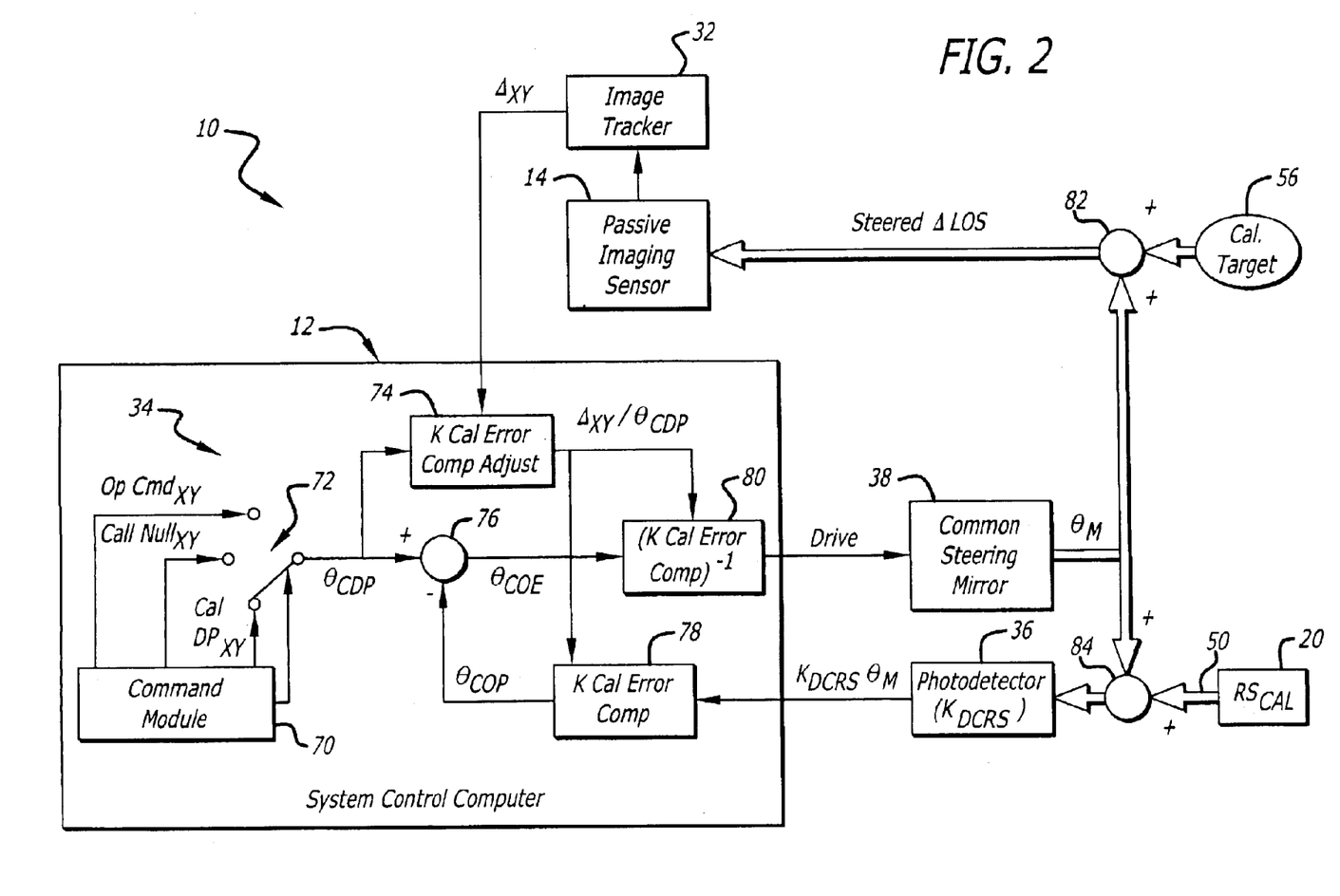
FIG. 2 is a more detailed diagram illustrating key functional modules of the sensor suite of FIG. 1 employed to calibrate an initial reference source.

FIG. 2 is a more detailed diagram illustrating key functional modules of the sensor suite 10 of FIG. 1 employed to calibrate the first reference source 20, i.e., the calibration optical reference source. The calibration software 34 running on the system control computer 12 includes various modules to facilitate reference source calibration. The modules include a command module 70 that generates an operate command (Op Cmd$_{X,Y}$), a calibration null command (Cal Null$_{X,Y}$), and a calibration desired position command (Cal DP$_{X,Y}$). The command module 70 controls a switch 72 to selectively switch between the commands generated by the command module 70. The switch 72 acts as a 3-to-1 multiplexer that receives control input from the command module 70.

The output of the switch 72 is connected to an input of a scale factor error adjustment module (K Cal Error Comp Adjust) 74 and to a positive terminal of a subtractor 76. The image tracker 32 also provides input to the K Cal Error Comp Adjust module 74. An output of the K Cal Error Comp Adjust module 74 is connected to inputs of a scale factor module (K Cal Error Comp) 78 and an inverse scale factor module ((K Cal Error Comp)$^{-1}$) 80. The K Cal Error Comp module 78 receives input from the photodetector 36 and provides output to a negative terminal of the subtractor module 76. An output of the subtractor module 76 provides input to the (K Cal Error Comp)$^{-1}$ module 80. An output of the (K Cal Error Comp)$^{-1}$ module 80 represents a mirror drive signal that controls the common steering mirror 38.

The common steering mirror 38 moves by an angle ($\theta_M$) in response to the mirror drive command from the (K Cal Error Comp)$^{-1}$ module 80. The movement ($\theta_M$) of the common steering mirror 38 affects the line-of-sight of the passive imaging sensor 14 and the position of the first reference beam 50. The line-of-sight of the passive imaging sensor 14 corresponds to the path of electromagnetic energy emanating from the calibration target 56. The common steering mirror 38 is shown symbolically affecting the line-of-sight of the passive imaging sensor 14 and the first reference source 20 at a first sum point 82 and a second sum point 84, respectively.

In operation, the scale factors associated with the scale factor modules 78 and 80 are initially set to unity. The command module 70 initially causes the switch 72 to output the calibration null command. The resulting mirror drive signal output from the (K Cal Error Comp)$^{-1}$ module 80 causes the mirror to steer the first reference beam 50 to the approximate null position on the surface of the photodetector 36. However, since the first reference source 20 has not been calibrated yet, the spot caused by the first reference beam on the surface of the photodetector 36 may not be accurately centered on the null position. Nevertheless, the resulting position of the spot typically provides an effective initial starting point. Other starting positions and corresponding mirror drive commands may be employed without departing from the scope of the present invention.

Subsequently, the command module 70 causes the switch 72 to output the calibration desired position command (Cal DP$_{X,Y}$). In the present specific embodiment, the calibration desired position may be any position about the null of the photodetector 36.

The output of the K Cal Error Comp module 78 represents the calibration optical position ($\theta_{COP}$) and is equivalent to the output of the photodetector 36 multiplied by the scale factor K Cal Error Comp. The output of the photodetector 36 represents the product of photodetector scale factors ($K_{DCRS}$) and the angular position ($\theta_M$) of the mirror 38. Hence, $$\theta_{COP_t} = (K\text{ Cal Error Comp}) K_{DCRS} \theta_{M(t)}, \qquad [1]$$

where t is an integer variable representing time. The photodetector scale factors $K_{DCRS}$ are often initially unknown but are automatically accounted for via the calibration software 34.

Initially, K Cal Error Comp is set to unity (K Cal Error Comp=1). The calibration optical position $\theta_{COP}$ is subtracted from calibration desired position $\theta_{CDP}$ to yield a calibration optical error signal ($\theta_{COE}$):

$$\theta_{COE} = \theta_{CDP} - \theta_{COP} \qquad [2]$$

The calibration optical error signal $\theta_{COE}$ is then multiplied by the reciprocal of K Cal Error Comp via the (K Cal Error Comp)$^{-1}$ module 80, which provides the drive signal to the mirror 38 in response thereto. Hence, with reference to equations (1) and (2):

$$\text{Drive} = (\theta_{CDP})/(K\text{ Cal Error Comp}) - K_{DCRS}\theta_M. \qquad [3]$$

By applying the scale factor K Cal Error Comp via the K Cal Error Comp module 78 at an input of the calibration software 34 and then applying the inverse via the (K Cal Error Comp)$^{-1}$ module 80 at a corresponding output, the net gain of the calibration software 34 is unity such that the loop gain bandwidth is unchanged. This is desirable in many applications.

The mirror 38 is steered to an angle of $\theta_M$, which deflects the reference beam 50 and the line-of-sight of the passive imaging sensor 14 accordingly. The amount ($\Delta_{X,Y}$) by which the line-of-sight of the passive imaging sensor 14 is steered in response to the mirror movement $\theta_M$ is measured by the image tracker 32 with reference to the image formed by the stable calibration target 56 on the surface of the passive imaging sensor 14. The sensed movement $\Delta_{X,Y}$ is the difference between the null angular position ($\theta_{M0}$) measured by the image tracker 32 and the commanded position $\theta_M$ for each axis of motion:

$$\Delta_{X,Y} = \theta_M - \theta_{M0}. \qquad [4]$$

The sensed movement $\Delta_{X,Y}$ is then input to the K Cal Error Comp Adjust module 74. The K Cal Error Comp Adjust module 74 divides $\Delta_{X,Y}$ by the calibration desired position $\theta_{CDP}$ to yield $\Delta_{X,Y}/\theta_{CDP}$, which is a scale factor correction term that is employed to update K Cal Error Comp in accordance with the following equation:

$$(K\text{ Cal Error Comp})_t = (K\text{ Cal Error Comp})_{t-1} (\Delta_{X,Y\,t}/\theta_{CDP}), \qquad [5]$$

where t is an integer index representing measurement time.

For the purposes of the present discussion, various terms representing angular motion or position, such as $\Delta_{X,Y}$ and $\theta_{CDP}$, represent vectors with horizontal and vertical angular displacement components. Consequently, when determining scale factors, standard vector division and multiplication is employed. For example, the quantity $\Delta_{X,Y}/\theta_{CDP}$ represents the ratio of two vectors. ←PETER, IS THIS CORRECT?

With reference to equation (3) and (5), if the tracked movement $\Delta_{X,Y}$ is greater than the desired or commanded movement $\theta_{CDP}$, then K Cal Error Comp increases during the next measurement interval, since the applied correction factor $\Delta_{X,Y}/\theta_{CDP} > 1$. Consequently, the drive signal (see equation (3)) decreases, which causes the subsequent commanded mirror angle $\theta_{M(t+1)}$ to decrease, which then reduces $\Delta_{X,Y}$ so that $\Delta_{X,Y}$ more closely matches $\theta_{CDP}$. Similarly, if $\Delta_{X,Y}$ is less than the desired or commanded movement $\theta_{CDP}$, then K Cal Error Comp decreases during the next measurement interval, since $\Delta_{X,Y}/\theta_{CDP} < 1$. Consequently, the drive signal increases, which causes the subsequent commanded mirror angle $\theta_{M(t+1)}$ to increase, which then increases $\Delta_{X,Y}$ so that $\Delta_{X,Y}$ more closely matches $\theta_{CDP}$. The loop continues iterating at times t until at time T:

$$(\Delta_{X,Y})_T/(\theta_{CDP}) = \pm 0.001. \quad [6]$$

The resulting values for K Cal Error Comp 78 are saved via memory (not shown) on the system control computer 12 for use by auto-alignment loops (see 58 of FIG. 1.

A method according to the teachings of the present invention includes the following steps:

1. Forward a control signal to a controllable mirror intended to move the controllable mirror by a predetermined angle.
2. Measure an amount by which the controllable mirror moves a line-of-sight of a certain component and provide a movement measurement in response thereto.
3. Automatically correct the control signal so that the controllable mirror moves the desired amount based on the measurement.

Connections between the common mirror 38, the system control computer 12, the passive imaging sensor 14, and the image tracker 32 represent a closed auto-alignment loop. Initially, the position caused by the spot of the first reference beam 50 on the surface of the photodetector 36 is nulled in response to a zero alignment loop desired position command ($DP_{X,Y}=0$) for each axis X and Y. The image tracker 32 measures the initial null angle ($\theta_{M0}$) at time (t=0), averaging a number of samples (N), where the increments of N are image frames that corresponding to measuring time increments of (t). The scale factor adjustment term (K Cal Error Comp) is initially set to unity in each axis (K Cal Error Comp $_{(t=0)}=1$).

The auto-alignment loop is given a calibration desired position command ($\theta_{CDP}$) relative to the null position for respective motion in the X and Y axis on the photodetector 36. The calibration loop optical error ($\theta_{COE}$) is driven to zero, such that the loop feedback term, which is the calibration optical position ($\theta_{COP}$), equals the command desired position ($\theta_{CDP}$) in accordance with the following equations:

$$\theta_{COE(T+1)} = \theta_{CDP(T+1)} - \theta_{COP(T+1)} => 0 \theta_{COP(T+1)} => \theta_{CDP(t+1)} \quad [7]$$

The calibration optical position ($\theta_{COP}$) feedback term is the product of the calibration loop gain term K Cal Error Comp, the non-calibrated composite photodetector and calibration reference source scale factors $K_{DCRS}$ for each axis, and the angular motion on the photodetector $\theta_M$ for each axis.

$$\theta_{COP(t+1)} = (K \text{ Cal Error Comp}_t)(K_{DCRS})\theta_{M(t+1)} \quad [8]$$

The average angular motion of the calibration optical reference source 20 on the photodetector 36 is measured by the image tracker 32 for the desired position command at time (t+1). The difference image angle ($\Delta_{X,Y}$) in each axis between the tracker measured null angle ($\theta_{M0}$) and the commanded desired angle ($\theta_M$) is calculated by the system processor for each axis of motion as given in equation (4).

The magnitude of the feedback gain of the sensor auto-alignment loop (K Cal Error Comp) for each axis is adjusted after each measuring time (t) by multiplying it by the calibration correction term ($\Delta K$ Cal correction$_{(t)} = (\Delta_{X,Y})_t/(\theta_{CDP})$), which is the ratio of the measured difference image angle $\Delta_{X,Y}$ and the command desired position $\theta_{CDP}$ (see equation (5)). The correction term ($\Delta K$ Cal correction $_{(t)}$) is applied until the measured angular difference $\Delta_{X,Y}$ output from the image tracker 32 equals the desired position command for each respective axis ($\Delta_{X,Y} = \theta_{CDP}$). Hence, the calibration correction term ($\Delta K$ Cal correction) will be approximately unity in accordance with equation (6).

If the calibration correction term ($\Delta K$ Cal correction) is less than unity, i.e., the angular difference travel ($\theta_M - \theta_{M0}$) is less than the desired position $\theta_{CDP}$, such that $(\Delta_{X,Y})_t/(\theta_{CDP}) < 1$, then the calibration optical position ($\theta_{COP}$) feedback term decreases in magnitude when the correction term $(\Delta_{X,Y})_t/(\theta_{CDP})$ is applied to the feedback.

$$\theta_{COP_t} = (K \text{ Cal Error Comp}_{t-1})[(\Delta_{X,Y})_t/(\theta_{CDP})](K_{DCRS})\theta_{M(t)}, \quad [9]$$

such that the resulting angular travel must increase ($\theta_{M(t+1)} > \theta_{M(t)}$) for the loop error to remain zero, thereby making the next measurement of the angular travel (($\Delta_{X,Y})_{t+1}/(\theta_{CDP})$) larger, i.e., closer to unity.

If the calibration correction term ($\Delta K$ Cal correction) is greater than unity, i.e., the angular difference travel ($\theta_M - \theta_{M0}$) is greater than the desired position $\theta_{CDP}$ such that $(\Delta_{X,Y})_t/(\theta_{CDP}) > 1$, then the calibration optical position $\theta_{COP}$ feedback term increases in magnitude when the correction term $(\Delta_{X,Y})_t/(\theta_{CDP})$ is applied to the feedback (see equation (9)). Consequently, the resulting angular travel must decrease travel ($\theta_{M(t+1)} < \theta_{M(t)}$) for the loop error to remain zero, thereby making the next measurement of the angular travel (($\Delta_{X,Y})_{t+1}/(\theta_{CDP})$) smaller, i.e., closer to unity.

After equation (6) is satisfied, the automatic calibration of the calibration optical reference source 20 is complete. The final magnitudes of the feedback gains (K Cal Error Comp) of the Calibration Sensor auto-alignment loop are electronically stored and applied to the sensor auto-alignment loop on system turn on.

Figure 3:
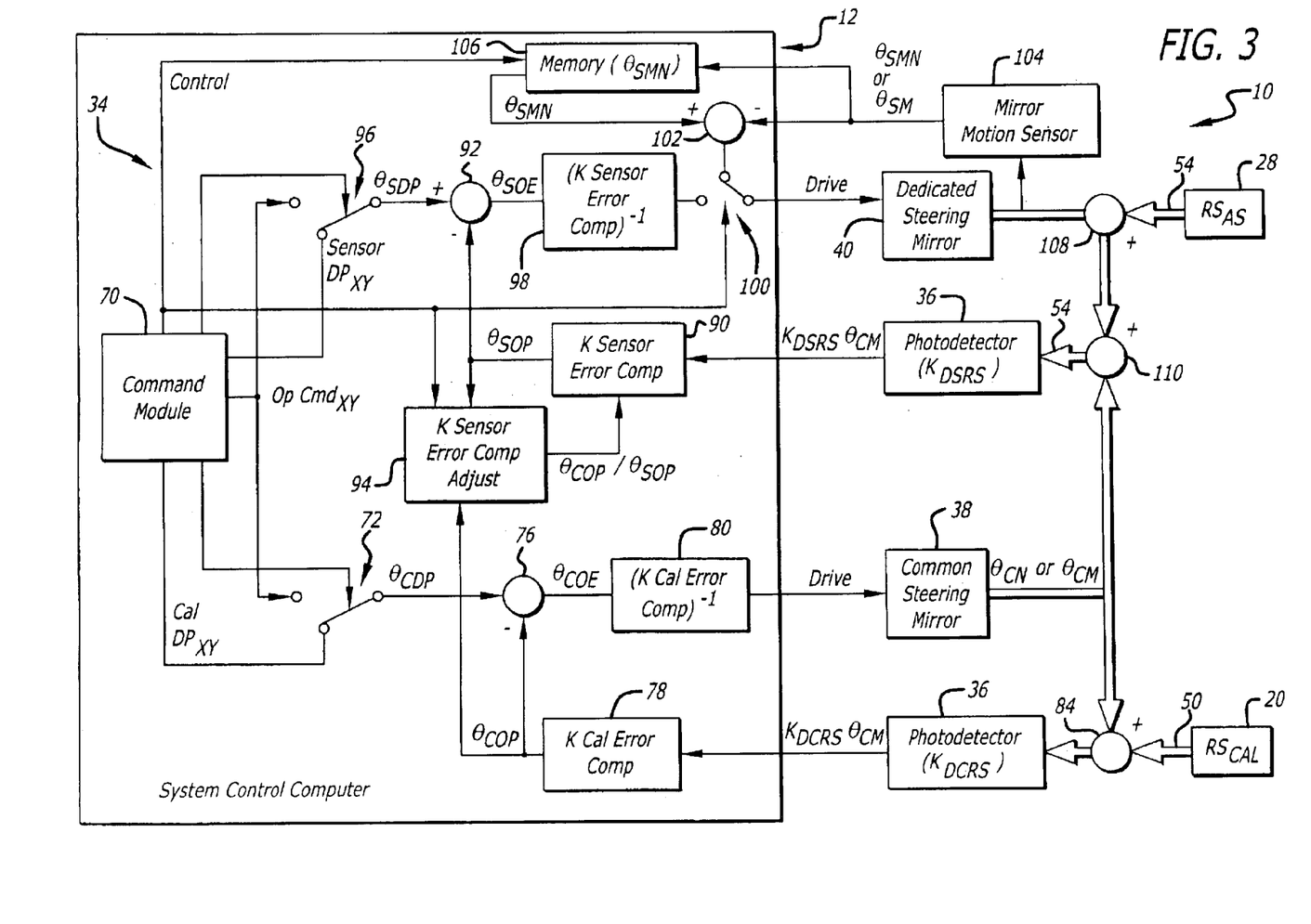
FIG. 3 is a more detailed diagram illustrating key functional modules of the sensor suite of FIG. 1 employed to calibrate a different reference source based on the calibrated initial reference source.

FIG. 3 is a more detailed diagram illustrating key functional modules of the sensor suite 10 of FIG. 1 employed to calibrate the third reference source 28 based on the calibrated initial reference source 20. The initial reference source 20 has been calibrated in accordance with the methods of FIG. 2.

After calibrating the first reference source 20, certain modules required to calibrate the first reference source 20 are no longer required to calibrate the next reference source 28, which is the third reference source 28 of FIG. 1. Consequently, for clarity, certain modules shown in FIG. 2, such as the K Cal Error Comp Adjust module 74 and the image tracker 32 are not shown in FIG. 3.

The calibration software 34 shown in FIG. 3 is configured to calibrate the third reference source 28, which is time-multiplexed with the first reference source 20. Those skilled in the art will appreciate that other types of multiplexing, such as frequency multiplexing may be employed without departing from the scope of the present invention.

Additional modules not shown in FIG. 2, but shown in FIG. 3, include a K Sensor Error Comp module 90, which maintains the scale factor associated with the third reference source 28, the photodetector 36, and the independent sensor mirror 40. The K Sensor Error Comp module 90 receives input from the photodetector 36 and provides output to a negative terminal of a second subtractor 92 and to a K Sensor Error Comp Adjust module 94. The photodetector 36 is shown as two separate photodetectors 36 to more clearly illustrate how different values are output from the photodetector 36 for different reference source beams 50, 54 and how the different photodetector outputs are handled by different portions of the calibration software 34.

The K Sensor Error Comp Adjust module 94 provides feedback to the K Sensor Error Comp module 90. The K Sensor Error Comp Adjust module 94 also receives calibration optical position input ($\theta_{COP}$) from the K Cal Error Comp module 78 and receives control input from the command module 70. The control input from the command module 70 selectively enables and disables the K Sensor Error Comp adjust module 94.

The command module 70 controls a second switch 96 to selectively output an operate command (Op $Cmd_{X,Y}$) or a sensor desired position command (Sensor $DP_{X,Y}$) to a positive terminal of the second subtractor 92. An output of the second subtractor 92 represents a sensor optical position error ($\theta_{SOE}$), which is input to an inverse K Sensor Error Comp module (K Sensor Error Comp)$^{-1}$ 98. The output of the (K Sensor Error Comp)$^{-1}$ module 98 represents a sensor mirror drive signal, which is input to a third switch 100. The third switch 100 is controlled by the command module 70 to selectively switch between the sensor mirror drive signal output from the (K Sensor Error Comp)$^{-1}$ module 98 or an output of a third subtractor 102. The output of the third switch 100 is connected to an input of the sensor independent steering mirror 40 and provides the mirror drive signal for the independent mirror 40. The third switch 100 acts as a 2-to-1 multiplexer that receives control input from the command module 70.

A mirror motion sensor 104 is connected to the sensor mirror 40 and provides mirror position and/or motion information ($\theta_{SMN}$ or $\theta_{SM}$) to a negative terminal of the third subtractor 102 and to a sensor mirror null position ($\theta_{SMN}$) memory 106. The $\theta_{SMN}$ memory 106 receives control input from the command module 70 that selectively controls reading to and writing from the $\theta_{SMN}$ memory 106. The $\theta_{SMN}$ memory 106 selectively outputs non-calibrated sensor mirror null position information ($\theta_{SMN}$) to a positive terminal of the third subtractor 102.

The independent mirror 40 is shown symbolically affecting the third reference beam 54 output from the third reference source 28 at a third sum point 108. After the third reference beam 54 reflects from the independent steering mirror 40, it reflects from the common steering mirror 38. The effect of the common steering mirror 38 on the third reference beam 54 is symbolically illustrated via a fourth sum point 110. The third reference beam 54 then impinges on the surface of the photodetector 36.

In operation, initially, the command module 70 sets the calibration desired position command ($\theta_{CDP}$) and a sensor desired position command ($\theta_{SDP}$) to zero, making these commands equivalent to the null command. The command module 70 sets the output of the first switch 72 to null ($\theta_{CDP}=0$) and the output of the second switch 96 to null ($\theta_{SDP}=0$). The command module 70 also closes the third switch 100 so that the output of the (K Sensor Error Comp)$^{-1}$ module 98 is fed to the sensor mirror 40 as a drive signal. In addition, the command module 70 disables the K Sensor Error Comp Adjust module 94 via a disabling command. The components 94, 100, 106 may be designed so that in initialization mode, one control signal from the command module 70 closes the third switch 100, connecting the output of the (K Sensor Error Comp)$^{-1}$ module 98 to the sensor mirror 40; enables writing to the $\theta_{SMN}$ memory 106, and disables the K Sensor Error Comp Adjust module 94. In calibration mode, a different signal may subsequently disable writing and enable reading from the $\theta_{SMN}$ memory 106; flip the switch 100 so that the output of the third subtractor 102 connects to the sensor mirror 40; and enable the K Sensor Error Comp Adjust module 94.

When in initialization mode, the calibration software 34 drives the common mirror 38 to a common mirror null position ($\theta_{CN}$) based on a null calibration desired position command ($\theta_{CDP}=0$). The movement of the common steering mirror 38, as indicated by motion of a spot caused by the first reference beam 50 on the photodetector 36, has been previously calibrated in accordance with FIG. 2 and is suitably accurate.

The calibration software 34 drives the independent steering mirror 40 based on a null sensor desired position command ($\theta_{SDP}=0$) output from the second switch 96. The resulting mirror position as detected by the mirror motion sensor 104 is the sensor mirror null position ($\theta_{SMN}$). The sensor mirror null position $\theta_{SMN}$ is written to the $\theta_{SMN}$ memory 106, which is enabled for writing via a control signal from the command module 70. After the non-calibrated sensor mirror null position $\theta_{SMN}$ is written to the $\theta_{SMN}$ memory 106, the calibration software 34 enters calibration mode.

In calibration mode, the command module 70 disables writing to the $\theta_{SMN}$ memory 106 but enables reading. The third switch 100 is flipped to a cage position so that the output of the third subtractor 102 connects to the sensor mirror 40. The K Sensor Error Comp Adjust module 94 is also enabled.

The command module 70 then generates a predetermined calibration desired position command ($\theta_{CDP}$), which is output from the first switch 72. A corresponding sensor desired position command ($\theta_{SDP}$) is output from the second switch 96. In the calibration mode, $\theta_{CDP}$ and $\theta_{SDP}$ may represent any position about the null. In some applications, $\theta_{CDP}$ and $\theta_{SDP}$ may be set equal to null (0) when the calibration software 34 is in calibration mode. The independent sensor steering mirror 40 is held steady in the null position via the cage loop that includes the sensor mirror 40, the mirror motion sensor 104, the third subtractor 102 (with $\theta_{SMN}$ input from the $\theta_{SMN}$ memory 106), and the third switch 100.

The common mirror 38 is steered by a known, calibrated amount in response to the calibration desired position command $\theta_{CDP}$ output from the first switch 72. The common mirror 38 steers both the first reference beam 50 and the third reference beam 54 at the first sum point 84 and the fourth sum point 110, respectively, by the same amount ($\theta_{CM}$) Consequently, the movement ($\theta_{COP}$) of the spot caused by the first reference beam 50 on the surface of the photodetector 36 should match the movement ($\theta_{SOP}$) of the spot associated with the third reference beam 54.

The loop formed between the K Sensor Error Comp Adjust module 94 and the K Sensor Error Comp module 90 adjusts the K Sensor Error Comp scale factor so that the sensor optical position $\theta_{SOP}$ matches the calibration optical position $\theta_{COP}$. The K Sensor Error Comp adjust module 94 multiplies the K sensor Error Comp scale factor by the scale factor adjustment $\theta_{COP}/\theta_{SOP}$. If $\theta_{SOP}$ output from the K Sensor Error Comp module 90 is larger than $\theta_{COP}$, then the scale factor adjustment $\theta_{COP}/\theta_{SOP}$ will be less than unity. This results in a reduction in the K sensor Error Comp scale factor that is applied to the output ($K_{DSRS}\theta_{CM}$) of the photodetector 36 to yield $\theta_{SOP}$. Consequently, $\theta_{SOP}$ is decreased by the adjustment so that is closer to $\theta_{COP}$. Similarly, if $\theta_{SOP}$ is less than $\theta_{COP}$ is, then the scale factor adjustment $\theta_{COP}/\theta_{SOP}$ is larger than unity. Consequently, multiplication of the K Sensor Error Comp scale factor with scale factor adjustment $\theta_{COP}/\theta_{SOP}>1$ increases the K Sensor Error Comp scale factor and $\theta_{SOP}$ so that $\theta_{SOP}$ is closer to $\theta_{COP}$.

The K Sensor Error Comp scale factor applied to the output of the photodetector 36 ($K_{DSRS}\theta_{CM}$) via the K Sensor Error Comp module 90 is adjusted via the K Sensor Error Comp Adjust module 94 until $\theta_{COP}$ is approximately equal to $\theta_{SOP}$ such that:

$$\theta_{COP}/\theta_{SOP}=1\pm0.001. \quad [10]$$

Calibration of the third reference source 28 is then complete.

The resulting value for the K Sensor Error Comp scale factor automatically accounts for any unknown scale factors, such as the composite scale factor $K_{DSRS}$, which incorporates scale factors resulting from the third reference source 28 and the photodetector 36. The resulting value for the K Sensor Error Comp scale factor is stored in memory (not shown) in the system control computer 12 and is used during system operation by auto-alignment software (see 58 of FIG. 1). This ensures accurate correspondence between operate commands (Op Cmd$_{X,Y}$) generated via the command module 70 and the resulting movement of lines-of-sight of accompanying sensors (see 14 and 18 of FIG. 1). The movement of the lines-of-sight of the sensors 14, 18 corresponds to the movement of reference spots on the surface of the photodetector 36 caused by the corresponding reference sources 20, 28, since the reference sources 20, 28 are rigidly aligned to respective sensors 14, 18 of FIG. 1.

The calibration software 34 of FIG. 3 is shown implementing calibration of time-multiplexed reference sources. The sensor suite 10 of FIG. 1 may simultaneously employ plural sensors 14, 18 and corresponding reference sources 20, 28. The reference sources 14, 18 are time-multiplexed onto the common photodetector 36 and share the common steering mirror 38 in their optical paths. The process illustrated in FIG. 3 and implemented via the calibration software 34 assumes that one source, i.e., the calibration optical reference source 20, has been initially calibrated in accordance with processes discussed with reference to FIG. 2. The additional non-calibrated source, i.e., the third reference source 28, is called the sensor reference source and has the additional independent steering mirror 40 in its optical path. The calibration software 34 determines the unique scale factor constant (K Sensor Error Comp) for the third reference source 28 in two basic steps.

In a first step, the non-calibrated mirror null angle $\theta_{SMN}$ for the independent steering mirror 40 in both horizontal (X) and vertical (Y) axis is determined by auto-aligning the independent steering mirror 40 and the common steering mirror 38 to a null command. The calibration desired position command $\theta_{CDP}$ and the sensor desired position command $\theta_{SDP}$ are zero. The common steering mirror 38 steers the third reference beam 54 by a null angle ($\theta_{CN}$), while the system control computer 12 measures the sensor mirror null angle $\theta_{SMN}$ and stores it in the $\theta_{SMN}$ memory 106.

In a second step, the calibration gain scale factor (K Sensor Error Comp), which causes the optical position output $\theta_{SOP}$ of the non-calibrated sensor 28 to match the optical position output $\theta_{SOP}$ associated with the calibrated sensor 20 for the calibration desired position command $\theta_{CDP}$, is determined.

The common steering mirror 38 physically steers both the first reference beam 50 of FIG. 1 and the third reference beam 54 by the same optical amount ($\theta_{CM}$), assuming all other optical elements affecting paths of the reference beams 50, 54 are motionless. The non-calibrated sensor optical position $\theta_{SOP}$ output from the common photodetector 36 is then automatically scaled, via the K Sensor Error Comp adjustment module 94, to equal the calibrated optical position $\theta_{COP}$ output from the K Cal Error Comp module 78 within desired tolerances.

In the second step, the sensor auto-alignment loop, which includes components and modules 98, 100, 102, 40, 36, 90, and 92 required to align the third reference beam 54, is closed in a caged position loop, with the input position command being the sensor null angle $\theta_{SMN}$. In this case, the sensor mirror angle ($\theta_{SM}=\theta_{SMN}$) is in the initial position as when both calibration and sensor auto-alignment loops were auto-aligning to the null command in the initial step.

The sensor scale factor term (K Sensor Error Comp) is initially set to unity in each X and Y axis (K Sensor Error Comp$_{X,Y}$=1). The calibration auto-alignment loop, which includes the modules and components 76, 80, 38, 36, and 78 employed to command the motion of the first reference beam 50, is commanded to move the desired position (DP$_{X,Y}$=($\theta_{CDP}$)$_{X,Y}$) corresponding to the calibration desired position $\theta_{CDP}$ in each axis. Since K Sensor Error Comp and $\theta_{CDP}$ are understood to be vectors with components in both X and Y axis, the X,Y subscripts are typically omitted.

For proper loop operation, the calibration loop optical error $\theta_{COE}$ is driven to zero so that the calibration optical position $\theta_{COP}$ is equal to the calibration desired position $\theta_{CDP}$ as given in equations (7).

The calibration reference beam, which is the first reference beam 50, was moved the desired amount (DP$_{X,Y}$) on the photodetector 36 by the common mirror motion of $\theta_{CM}$. Consequently, the third reference beam 54 is moved the same amount ($\theta_{CM}$), while the independent sensor steering mirror 40 remains stationary at the null position.

The sensor optical position $\theta_{SOP}$ feedback term is the product of the sensor gain term K Sensor Error Comp, the non-calibrated composite photodetector and sensor reference source scale factors ($K_{DSRS}$) for each axis, and the angular motion $\theta_{CM}$ on the photodetector 36 for each axis resulting from the motion of the common calibration steering mirror 38 in accordance with the following equation:

$$\theta_{SOP}=(K \text{ Sensor Error Comp})(K_{DSRS})\theta_{CM}. \quad [11]$$

When the independent sensor reference source 40 is calibrated, the ratio of the calibration optical position $\theta_{COP}$ and the sensor optical position $\theta_{SOP}$ is unity within a predetermined tolerance. This ratio is the sensor correction term (ΔK Sensor correction):

$$\Delta K \text{ Sensor correction } (\theta_{COP})/(\theta_{SOP}), \quad [12]$$

The sensor correction term ΔK Sensor correction is determined by the calibration software 34, which takes an average of N samples of the calibration optical position $\theta_{COP}$ and the sensor optical position $\theta_{SOP}$ and determines the correction ratio (ΔK Sensor correction). The correction ratio ΔK Sensor correction is applied to the previous sensor scaling value (K Sensor Error Comp$_{t-1}$) at the next increment update(s):

$$K \text{ Sensor Error Comp}_t=(K \text{ Sensor Error Comp}_{t-1})(\theta_{COP(t)})/(\theta_{SOP(t)}). \quad [13]$$

Equation 13 is implemented until the sensor optical position $\theta_{SOP}$ and the calibration optical position $\theta_{COP}$ are equal for each respective X and Y axis:

$$\theta_{SOP}[K \text{ Sensor Error Comp}_{t-1}(\theta_{COP(t)})/(\theta_{SOP(t)})](K_{DSRS})\theta_{CM}=\theta_{COP} \quad [14]$$

such that ΔK Sensor correction=1±0.001.

Automatic calibration of the third reference source 28 (sensor optical reference source) is now complete. The final magnitudes of the feedback gains (K Sensor Error Comp) of the sensor auto-alignment loop are now electronically stored via the calibration software 34 on the system control computer 12 and applied to the sensor auto-alignment loop on system turn on.

If the sensor calibration correction term (ΔK Sensor correction) is less than unity then the sensor optical position term $\theta_{SOP}$ is greater than the calibration optical position term $\theta_{COP}$ for the same angular travel $\theta_{CM}$ such that $(\theta_{COP(t)})/(\theta_{SOP(t)})<1$. Application of this correction term K Sensor Error Comp<1 to the sensor optical position $\theta_{SOP}$ feedback term then causes the magnitude of the sensor optical position $\theta_{SOP}$ term to decrease such that the subsequent ratio $(\theta_{COP(t+1)})/(\theta_{SOP(t+1)})$ gets closer to unity.

If the sensor calibration correction term (ΔK Sensor correction) is greater than unity, i.e., the sensor optical position term $(\theta_{SOP(t)})$ is less than the calibration optical position term $(\theta_{COP(t)})$ for the same angular travel $\theta_{CM}$, $(\theta_{COP(t)})/(\theta_{SOP(t)})>1$. When this correction term ΔK Sensor correction>1 is applied to the smaller sensor optical position $\theta_{SOP}$ feedback term, the magnitude of the sensor optical position $\theta_{SOP}$ term increases such that the subsequent ratio $(\theta_{COP(t+1)})/(\theta_{SOP(t+1)})$ gets closer to unity.

Figure 4:
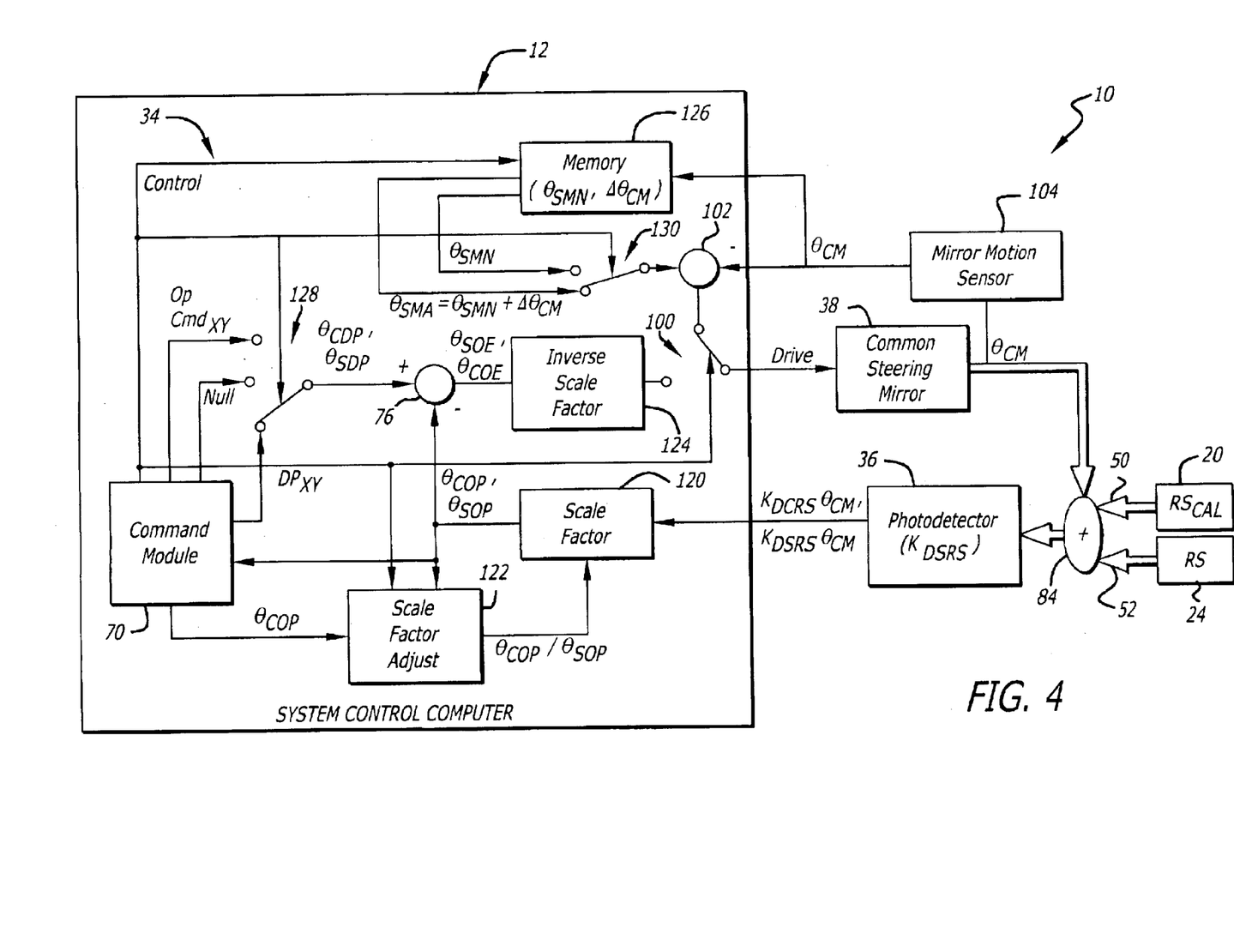
FIG. 4 is a diagram illustrating key functional blocks of a system for performing reference source calibration for a sensor lacking an image tracker or a sensor that is otherwise not multiplexed with a calibration reference source.

FIG. 4 is a diagram illustrating key functional blocks of the sensor suite 10 of FIG. 1 for performing reference source calibration for the second passive sensor 16 of FIG. 1. Calibration methods discussed with reference to FIG. 4 are particularly useful for calibrating reference sources associated with sensors lacking accompanying image trackers or sensors that are otherwise not time-multiplexed with a calibration reference source having an accompanying image tracker, such as the second passive sensor 16 of FIG. 1. For clarity, while the calibration software 34 includes many additional modules, only those modules employed to calibrate the non-time-multiplexed reference source 24 are shown.

The calibration software 34 includes a scale factor module 120, a scale factor adjustment module 122, an inverse scale factor module 124, and a mirror position memory 126. The scale factor module 120 behaves similarly to the K Cal Error comp module 80 or the K Sensor Error Comp module 90 of FIG. 3, respectively, depending on the operational mode of the calibration software 34. The scale factor adjustment module 122 acts similarly to the K Cal Error Comp adjust module 94 of FIG. 3 when enabled during a specific operational mode, as discussed more fully below.

The command module 70 selectively outputs a sensor desired position command (Sensor DP$_{X,Y}$), a null command (Null), or an operate command (Op Cmd$_{X,Y}$) via a fourth controllable switch 128, which acts as a 3-to-1 demultiplexer. Those skilled in the art will appreciate that the null command, which is equivalent to a sensor desired position command of zero (Sensor DP$_{X,Y}$=0), may be incorporated into the Sensor DP$_{X,Y}$ command, which would make the switch 128 a 2-to-1 demultiplexer.

An output of the fourth controllable switch 128 provides input to positive negative terminal of the first subtractor 76. An output of the scale factor module 120 is connected to negative terminal of the first subtractor 76, the command module 70, and the scale factor adjustment module 122. An output of the scale factor adjustment module 122 provides feedback to the scale factor module 120. An additional input of the scale factor module 120 is connected to an output of the photodetector 36. An output of the first subtractor 76 is connected to an input of the inverse scale factor module 124. An output of the inverse scale factor module 124 is connected to a first input of the third switch 100. A second input of the third switch 100 is connected to an output of the third subtractor 102. An output of the third switch 100 provides a drive signal to the common mirror 38. The common mirror 38 deflects the first reference beam 50 or the second reference beam 52 at different times onto the surface of the photodetector 36. The deflection is shown symbolically to occur at the first sum point 84.

The angle by which the common mirror 38 moves in response to a drive signal is measured by the mirror motion sensor 104 connected to the common mirror 38.

The movement and/or position of the common mirror 38 is input to the mirror position memory 126 and to a negative terminal of the third subtractor 102.

The mirror position memory 126 is selectively enabled for writing or reading via a control signal from the command module 70. The mirror position memory 126 stores measured positions, including the calibration null mirror position ($\theta_{CMN}$) and a command position ($\theta_{CMC}$) associated with the pre-calibrated calibration reference source 20 and including a sensor mirror null position ($\theta_{SMN}$) associated with the second reference source 24. The mirror position memory 126 then provides the sensor mirror null position $\theta_{SMN}$ and a sensor mirror position ($\theta_{SMA}$) to different terminals of a fourth switch 130. The sensor mirror position $\theta_{SMA}$ is given by the following equation:

$$\theta_{SMA}=\theta_{SMN}-\Delta\theta_{CM}, \quad [15]$$

where $\Delta\theta_{CM}=\theta_{CMC}-\theta_{CMN}$, which is computed via a subtractor and adder (not shown) included in the mirror position memory 126. The command module 70 controls the fourth switch 130 to output $\theta_{SMA}$ or $\theta_{SMN}$ to a positive terminal of the third subtractor 102 depending on the operational mode of the calibration software 34.

In operation, during a first operational mode, the scale factor adjustment module 122 is disabled. With reference to FIGS. 2, 3 and 4, the scale factor module 120 behaves as the K Cal Error Comp module 78 of FIG. 2 or 3 and employs the calibrated K Cal Error Comp values determined in accordance with methods disclosed with reference to FIG. 2. The inverse scale factor module 124 acts as the (K Cal Error Comp)$^{-1}$ module 80. The third switch 100 connects the output of the inverse scale factor circuit 124 to the input of the common mirror 38. The command module 70 outputs a calibration null command from the fourth controllable switch 128. The mirror position memory 126 is enabled for writing via a control signal from the command module 70. The second reference source 24 is disabled, and the first reference source 20 is enabled.

The calibrated K Cal Error Comp values, which are applied via the scale factor module 120 to the output ($K_{DCRS}\theta_{CMN}$) of the photodetector 36, ensure that the null command output from the fourth switch 128 accurately commands the common mirror 38 to direct the first beam 50 output from the calibration reference source 20 to the null position on the surface of the photodetector 36. The angular position ($\theta_{CMN}$) of the common mirror 38 resulting from the calibration null command is measured by the mirror motion sensor 104 and written to the mirror position memory 126.

Subsequently, during the first operational mode, the command module 70 outputs a calibration desired position command ($\theta_{CDP}$) from the fourth switch 128. This causes the common mirror 38 to accurately deflect the first reference beam 50 on the surface of the photodetector 36 by an amount precisely corresponding to the calibration desired position command $\theta_{CDP}$. The mirror motion sensor 104 then measures the commanded angular position of the mirror ($\theta_{CMC}$) and writes it to the mirror position memory 126. The calibration optical position ($\theta_{COP}$) output from the scale factor adjustment module 120 is written to memory (not shown) in or connected to the command module 70.

Subsequently, the calibration software 34 enters a second operational mode. During the second operational mode, the scale factor adjustment module 122 is also disabled. The scale factor module 120 acts as the K Sensor Error Comp adjust module 90 of FIG. 3. The inverse scale factor circuit 124 acts as the (K Sensor Error Comp)$^{-1}$ module 98 of FIG. 3. The output of the inverse scale factor module 124 is output from the third switch 100 and drives the common mirror 38. The mirror position memory 126 is enabled for writing. The first calibration optical reference source 20 is disabled, and the second reference source 24 is enabled.

Initially, during the second operational mode, the command module 70 outputs a sensor mirror null command from the fourth switch 128 to move the spot caused by the second reference beam 52 to the null position on the surface of the photodetector 36. However, commands for driving the common mirror 38 to accurately steer the second reference beam 52 may not be accurate, since the second reference source 24 has not yet been calibrated and need not yet be calibrated. Sensor calibration in accordance with the configuration of the calibration software 34 shown in FIG. 4 is based on a comparison between a change in position of the common mirror 38 in response to a control command for the calibrated first reference beam 50 and between a corresponding change in position for the second reference beam 52, as discussed more fully below.

The sensor mirror null position $\theta_{SMN}$ of the common mirror 38 in response to a sensor mirror null command is measured by the mirror motion sensor 104 and written to the mirror position memory 126. The sensor mirror null position $\theta_{SMN}$, the calibration null position $\theta_{CMN}$, and the calibration commanded position $\theta_{CMC}$ are stored in the mirror position memory 126. The mirror position memory 126 also includes a subtractor and an adder (not shown) for computing and outputting the desired sensor mirror position $\theta_{SMA}$ of equation (15) during a third operational mode.

During the third operational mode, the mirror position memory 126 is enable for reading, and the third switch 100 and the fourth switch 130 are configured so that the sensor mirror null position $\theta_{SMN}$ output from the sensor mirror memory 126 directs the common mirror 38 to the null position. Furthermore, the scale factor adjustment module 122 is enabled and receives as input the calibration optical position $\theta_{COP}$ information that was stored in the command module 70 during the first operational mode. The scale factor adjustment circuit 122 also receives as input the sensor optical position $\theta_{SOP}$ output from the scale factor module 120.

Subsequently, the fourth switch 130 outputs the sensor mirror desired position angle $\theta_{SMA}$ in response to a control signal from the command module 70 that controls the fourth switch 130 and enables the mirror memory 126 to output the sensor desired position command $\theta_{SMA}$. The resulting sensor optical position $\theta_{SOP}$ is input to the scale factor adjustment module 122. The scale factor adjustment module 122 computes the ratio $\theta_{COP}/\theta_{SOP}$, which is multiplied by the previous scale factor (K sensor Error Comp) to yield an updated scale factor. This continues in a manner similar to the K Sensor Error Comp adjustment module 94 of FIG. 3 until $\theta_{COP}/\theta_{SOP}$ is approximately ±0.001.

The common mirror 38 moves both the first reference beam 50 and the second reference beam 52 by the same amount when it moves by a predetermined distance. Recall that in the first operational mode, the reference spot caused by the first reference beam 50 on the surface of the photodetector 36 was commanded to move a desired amount corresponding to a desired mirror movement ($\Delta\theta_{CM}$). This resulted in a calibrated optical position $\theta_{COP}$ output from the scale factor module 120 that was stored in the command module 70. In the third operational mode, the common mirror 38 is commanded to move by that same amount ($\Delta\theta_{CM}=\theta_{SMA}-\theta_{SMN}$) as during the first operational mode. Consequently, the resulting movement of the second reference beam 52, which is represented by the sensor optical position output ($\theta_{SOP}$) from the scale factor module 120, should match the calibrated optical position output ($\theta_{COP}$) during the first operational mode. However, $\theta_{SOP}$ may be different than $\theta_{COP}$ for various reasons, such a different scale factor ($K_{DSRS}$ versus $K_{DCRS}$) resulting from a combination of properties of the second reference beam 52 and properties of the photodetector 36.

The third operational mode acts to adjust the scale factor, K Sensor Error Comp, associated with the scale factor module 120 via the scale factor adjustment module 122 so that $\theta_{SOP}=\theta_{COP}$ within a desired, application-specific tolerance. The resulting values for K Sensor Error Comp are stored in memory (not shown) and used by an accompanying auto-alignment system (see 58 of FIG. 1) to accurately align sensors with one or more desired lines-of-sight.

The calibration software 34 of FIG. 4 employs an indirect reference source calibration method. The method is particularly useful in sensor suites employing multiple sensors that share a common mirror 38, such as the sensors 14 and 16 of the sensor suite 10 of FIG. 1, wherein only one of the corresponding reference sources 20, 24 is active at a time.

Calibration techniques in accordance with FIG. 2 are employed when the reference source is associated with a sensor that is also an imaging sensor that is connected to an image tracker, such as the imaging sensor 14 of FIG. 1.

However, if the reference source to be calibrated is associated with an active sensor, such as a laser, or otherwise has not imaging or tracking capabilities, then the indirect calibration process implemented in accordance with the calibration software 34 of FIG. 4 is employed.

The method implemented via the calibration software 34 of FIG. 4 includes the following three steps, which correspond to different operational modes of the software 34.:

1. Determine the mirror angle changes ($\Delta\theta_{CM}$) of the shared steering mirror 38 for the calibration alignment loop to move the calibration reference source 20 a desired change in position ($\Delta DP_{X,Y}$) on the common photodetector 36.
2. Determine the mirror angles ($\theta_{SMN}$) for the second reference beam 52 output from sensor reference source 24 to create a spot on the null on the photodetector 36.
3. Determine the calibration scale factor (K Sensor Error Comp) required to match the sensor optical position ($\theta_{SOP}$) associated with the non-calibrated reference source 24 to the calibration optical position ($\theta_{COP}$) associated with the calibrated reference source 20 for the same angle changes ($\Delta\theta_{CM}$) of the common steering mirror 38.

The above indirect calibration method relies on the fact that the common steering mirror 38 in the calibrated sensor auto-alignment loop physically steers both the calibrated reference beam 50 and non-calibrated sensor reference beam 52 by similar amounts for the same amount of common mirror angular travel ($\Delta\theta_{CM}$). This assumes that other optical elements in both paths are motionless. The non-calibrated sensor optical position $\theta_{SOP}$ provided via the common photodetector 36 is then automatically scaled to equal the calibrated optical position $\theta_{COP}$.

The calibration reference source alignment loop, which includes the components and modules 124, 38, 36, 120, and 76 required to align first reference beam 50 output by the first calibration reference source 20 during the first operational mode when the first reference beam 50 is activated, is initially commanded to a null position ($\theta_{CDP}=0$). The system control computer 12 measures the common steering mirror null angles ($\theta_{CMN}$) for each axis and stores them in the mirror position memory 126. The calibration reference source alignment loop is then commanded to a desired position ($DP_{X,Y}$) corresponding the calibration desired position command $\theta_{CDP}$. For proper loop operation, the calibration loop optical error ($\theta_{COE}$) output from the first subtractor 76 is driven to zero, such that the calibration optical position $\theta_{COP}$ is equal to the calibration desired position $\theta_{CDP}$ within a predetermined tolerance ($\theta_{COE}=\theta_{CDP}-\theta_{COP}=>0$). The system control computer 12 then measures the common steering mirror angles ($\theta_{CMC}$) for the change in optical position for each axis. The difference ($\Delta\theta_{CM}$) in steering mirror angles for a change in desired optical position ($\Delta\theta_{COP}=\theta_{COP}$) is the difference between the calibration and null mirror angles for each mirror axis ($\Delta\theta_{CM}=\theta_{CMC}-\theta_{CMN}$).

In the second step, the sensor auto-alignment loop, which includes the components and modules 124, 38, 36, 120, and 76 required to align second reference beam 52 during the second operational mode when the second reference source 24 is activated, is closed and commanded to a null position ($\theta_{SOP}=0$). The system control computer 12 measures the common steering mirror null angles ($\theta_{SMN}$) for each axis for the sensor optical reference source null.

In the third step, the sensor auto-alignment loop is cage with a position loop and the common steering mirror 38 is commanded to its alignment null position ($\theta_{SMA}=\theta_{SMN}$). The calibration software 34 then measures the sensor optical position for sensor alignment null ($\theta_{SOPN}$). The sensor position loop command ($\theta_{SMA}$) then equals the sum of the null position ($\theta_{SMN}$) and the difference ($\Delta\theta_{CM}$) in steering mirror angles for each axis for the calibrated change in desired optical position ($\Delta\theta_{COP}$) as shown in equation (15).

The calibration software 34 measures the sensor optical position $\theta_{SOP}$ for the calibrated change in desired optical position $\Delta\theta_{COP}$. The change in the sensor optical position ($\Delta\theta_{SOP}$) is then the difference of the sensor optical position $\theta_{SOP}$ and sensor optical position null ($\theta_{SOPN}$):

$$\Delta\theta_{SOP}=\theta_{SOP}-\theta_{SOPN}, \quad [16]$$

The sensor optical position ($\theta_{SOP}$) feedback term is the product of the sensor gain term (K Sensor Error Comp), the non-calibrated composite photodetector and calibration reference source scale factors $K_{DSRS}$ for each axis, and the change in angular motion on the photodetector $\Delta\theta_{CM}$ for each axis resulting from the motion of the common calibration steering mirror as given in the following equation:

$$\theta_{SOP}=(K \text{ Sensor Error Comp})(K_{DSRS})(\Delta\theta_{CM}). \quad [17]$$

When the second sensor reference source 24 is calibrated, the change in the sensor optical position ($\Delta\theta_{SOP}$) is then equal to the calibrated change in desired optical position ($\Delta\theta_{COP}$).

$$\Delta\theta_{SOP}=\Delta\theta_{COP}. \quad [18]$$

The ratio of the calibration optical position $\theta_{COP}$ and the sensor optical position $\theta_{SOP}$ must be unity within a tolerance ($\Delta K$ Sensor correction=$(\theta_{COP})/(\theta_{SOP})=1$). The sensor correction term ($\Delta K$ Sensor correction) is determined by the control computer 12, which takes an average of N samples of the calibration optical position $\theta_{COP}$ and the sensor optical position $\theta_{SOP}$. The calibration software 34 running on the control computer 12 determines the correction ratio ($\Delta K$ Sensor correction) and applies it to the previous sensor scaling value (K Sensor Error Comp) at the next increment update(s) in accordance with the following equation:

$$K \text{ Sensor Error Comp}_{(i)}=(K \text{ Sensor Error Comp}_{i-1})(\theta_{COP(i)})/(\theta_{SOP(i)}). \quad [19]$$

Equation (19) is implemented until the sensor optical position $\theta_{SOP}$ and the calibration optical position $\theta_{COP}$ are approximately equal for each respective axis, such that the sensor calibration correction term ($\Delta K$ Sensor correction) is unity within a predetermined tolerance ($\theta_{COP(i)}/\theta_{SOP(i)}=1\pm0.001$)

Automatic calibration of the sensor optical reference source 24 is then complete, and the final magnitudes of the feedback gains (K Sensor Error Comp) of the sensor auto-alignment loop are electronically stored and applied to the sensor auto-alignment loop on system turn on.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A system for calibrating an apparatus for aligning components relative to desired paths comprising:

first means for generating a command designed to move a line-of-sight of one of said components to a first position, said components being sensor system components and including one or more electromagnetic energy transmitters, receivers and/or sensors, said line-of-sight moving to a second position in response thereto and said line-of-sight being coincident with a first reference beam, and wherein said command corresponds to a mirror drive signal that controls a steering mirror positioned to selectively alter said line-of-sight and second means for automatically compensating for a variation between said first position and said second position via a scale factor, said second means further including:
a photodetector,
said steering mirror, said steering mirror being responsive to said command and positioned to direct said first reference beam onto said photodetector, thereby creating a reference spot corresponding to said first reference beam on a surface of said photodetector,
a processor in communication with said steering mirror and in communication with an output of said photodetector, and
software adapted to be executed by said processor and thereby generate said command and facilitate measurement of said first position and said second position of said first reference beam by measuring corresponding positions of said reference spot on said surface of said photodetector, said software adjusts feedback from line-of-sight measurements cutout from an image tracker in accordance with whether said line-of-sight measurements indicate that said steering mirror has moved more than a predetermined desired movement or less than a predetermined desired movement; and third means for adjusting said command via said scale factor so that said second position matches said first position.

2. The system of claim 1 wherein said components include an active sensor employing a laser beam.

3. The system of claim 1 wherein said components include a first reference source for providing said first reference beam and a second reference source for providing a second reference beam, said first reference beam aligned to a first component, and said second reference aligned to a second component.

4. The system of claim 3 wherein said steering mirror is a common steering mirror common to both said first reference beam and said second reference beam, said common steering mirror directing said first reference beam and said second reference beam onto the surface of said photodetector.

5. A system for calibrating apparatus for aligning components relative to desired paths comprising:

first means for generating a command designed to move a line-of-sight of one of said components to a first position, said components being sensor system components and including one or more electromagnetic energy transmitters, receivers and/or sensors, said line-of-sight moving to a second position in response thereto and said line-of-sight being coincident with a first reference beam, and wherein said command corresponds to a mirror drive signal that controls a steering mirror positioned to selectively alter said line-of-sight and second means for automatically compensating for a variation between said first position and said second position via a scale factor, said second means further including:
a photodetector,
said steering mirror, said steering mirror being responsive to said command and positioned to direct said first reference beam onto said photodetector, thereby creating a reference spot corresponding to said first reference beam on a surface of said photodetector,
a processor in communication with said steering mirror and in communication with an output of said photodetector, and
software adapted to be executed by said processor and thereby generate said command and facilitate measurement of said first position and said second position of said first reference beam by measuring corresponding positions of said reference spot on said surface of said photodetector, said software being adapted to adjust feedback from line-of-sight measurements output from an image tracker in accordance with whether said line-of-sight measurements indicate that said steering mirror has moved more than a predetermined desired movement or less than a predetermined desired movement; and third means for adjusting said command via said scale factor so that said second position matches said first position.

6. A system for calibrating an apparatus for aligning components relative to a desired path comprising:

first means for generating a command designed to move a line-of-sight of one of said components to a first position, said components being sensor system components and including one or more electromagnetic energy transmitters, receivers and/or sensors, said line-of-sight moving to a second position in response thereto and said line-of-sight being coincident with a first reference beam and wherein said command corresponds to a mirror drive signal that controls a steering mirror positioned to selectively alter said line-of-sight and second means for automatically compensating for a variation between said first position and said second position via a scale factor, said second means further including:
a photodetector,
said steering mirror, said steering mirror being responsive to said command and positioned to direct said first reference beam onto said photodetector, thereby creating a reference spot corresponding to said first reference beam on a surface of said photodetector,
a processor in communication with said steering mirror and in communication with an output of said photodetector, and software adapted to be executed by said processor and thereby generate said command and facilitate measurement of said first position and said second position of said first reference beam by measuring corresponding positions of said reference spot on said surface of said photodetector, said software including a module for determining calibration scale factors for said first reference source, yielding a calibrated reference source in response thereto and employing said calibrated reference source to determine calibration scale factors associated with said second reference source; and third means for adjusting said command via said scale factor so that said second position matches said first position, said components including a first referenced source for providing said first reference beam and a second reference source for providing a second reference beam, said first reference beam aligned to a first component, and said second reference aligned to a second component and steering mirror being a common steering mirror common to both said first reference beam and said second reference beam, said common steering mirror directing said first reference beam and said second reference beam onto the surface of said photodetector.

7. The system of claim 6 wherein said second reference source includes an additional steering mirror in a path of said second reference beam.

8. A system for calibrating a system for aligning components relative to desired paths comprising:

first means for generating a command designed to move a first reference beam to a first position, said first reference beam moving to a second position in response thereto;

second means for automatically measuring a deviation between said first position and said second position and adjusting a scale factor in response thereto; and third means for adjusting said command via said scale factor so that said second position matches said first position, said third means including a computer and said computer being adapted to receive feedback from an image tracker that indicates an amount by which a line-of-sight of said first reference beam has moved in response to said command.

9. The system of claim 8 wherein said software employs said feedback to adjust a calibration term that is applied to said command via said software, said software decreasing or increasing said command in accordance with said calibration term when said movement is larger or smaller than said desired movement, respectively.

10. A system for calibrating plural reference sources that share a common steering mirror in their respective optical paths comprising:

first means for automatically calibrating a first reference source so that a first mirror control command accurately moves a first reference beam output by said first reference source by a desired amount matching said control command and second means for calibrating a second reference source based on mirror control commands calibrated for said first reference source by adjusting a command to control movement of a second reference beam output by said second reference source based on movement of a steering mirror common to said first reference beam and said second reference beam in response to said first mirror control command.

11. A system for calibrating plural reference sources comprising:

a common mirror in an optical path of a first reference beam and a second reference beam output by a first reference source and a second reference source, receptively, said first reference source and said second reference source being multiplexed onto the surface of a photodetector and said second reference source having an additional steering mirror in its optical path, said additional steering mirror having means for holding said additional steering mirror steady at a sensor mirror null position ($\theta_{SMN}$) during calibration of said second reference source;

first means for automatically calibrating said first reference source by adjusting a mirror drive signal to said common mirror via a first adjustable scale factor so that movement of said first reference beam matches movement commanded via a command module, thereby yielding a calibrated reference beam in response thereto;

second means for moving said first calibrated reference beam to a desired position based on a desired position command, thereby moving said second reference beam from a first position to a second position; and third means for automatically calibrating said second reference source by adjusting a scale factor applied to a command to move said second reference beam from said first position to said second position so that when said scale factor is applied to said command, said command matches said second position.

12. A system for calibrating plural reference sources comprising:

a common mirror in an optical path of a first reference beam and a second reference beam output by a first reference source and a second reference source, receptively;

first means for automatically calibrating said first reference source by adjusting a mirror drive signal to said common mirror via a first adjustable scale factor so that movement of said first reference beam matches movement commanded via a command module, thereby yielding a calibrated reference beam in response thereto;

second means for moving said first calibrated reference beam to a desired position based on a desired position command, thereby moving said second reference beam from a first position to a second position; and third means for automatically calibrating said second reference source by adjusting a scale factor applied to a command to move said second reference beam from said first position to said second position so that when said scale factor is applied to said command, said command matches said second position, wherein said first reference source is not multiplexed with said reference source during reference source operation such that said first reference source is aligned before said second reference source is aligned or visa versa during operation of an accompanying auto-alignment system.

13. A system for calibrating a sensor suite component alignment system comprising:

a reference source outputting a reference beam that is rigidly aligned to a line-of-sight of a component requiring alignment to a predetermined line-of-sight said component being a sensor, said sensor providing output to an image tracker;

a photodetector capable of detecting said reference beam;

a steering mirror in an optical path of said reference source and directing said reference beam onto said photodetector; and a computer in communication with said steering mirror and said photodetector, said computer running software to automatically scale commands to said steering mirror to cause said commands to coincide with actual movement of said reference beam on said photodetector.

14. The system of claim 13 wherein said software includes one or more modules for adjusting feedback received from line-of-sight measurements output from said image tracker based on whether said line-of-sight measurements indicate that said steering mirror has moved more than a desired amount or less than said desired amount in response to said commands.

15. A method for calibrating a sensor system comprising:

forwarding a control signal to a controllable mirror intended to move the controllable mirror by a predetermined angle;

measuring an amount by which the controllable mirror moves a line-of-sight of a certain component and provide a movement measurement in response thereto, said certain component being a first sensor rigidly aligned with a first reference source, said first reference source transmitting a first reference beam onto a surface of said controllable mirror, said controllable mirror being positioned in paths of both said first reference beam and said second reference beam;

automatically correcting said control signal based on the measurement so that the controllable mirror moves said line-of-sight by a desired amount in response to a corrected control signal, said step of automatically correcting said control signal resulting in calibration of said first reference source yielding a calibrated reference source in response thereto;

calibrating a second reference source based on said calibrated reference source, which is associated with a scale factor that applied to said control signal to correct said control signal, said second reference source transmitting a second reference beam;

determining angle changes to said controllable mirror required for an accompanying calibration alignment loop to move said first reference beam by a desired change in position across a surface of a photodetector;

ascertaining mirror angles for said second reference beam output from said second reference source to create a spot on a null position on said surface of said photodetector; and adjusting a calibration scale factor required to match the sensor optical position associated with said second reference source to the calibration optical position associated with said calibrated reference source for similar angle changes of said common steering mirror, whereby said second reference source is calibrated.

16. A system for calibrating an apparatus for aligning components relative to a desired path comprising:

first means for generating a command designed to move a line-of-sight of one of said components to a first position, said components being sensor system components and including one or more electromagnetic energy transmitters, receivers and/or sensors, said line-of-sight moving to a second position in response thereto and said line-of-sight being coincident with a first reference beam, and wherein said command corresponds to a mirror drive signal that controls a steering mirror positioned to selectively alter said line-of-sight and second means for automatically compensating for a variation between said first position and said second position via a scale factor, said second means further including:
a photodetector,
said steering mirror, said steering mirror being responsive to said command and positioned to direct said first reference beam onto said photodetector, thereby creating a reference spot corresponding to said first reference beam on a surface of said photodetector,
a processor in communication with said steering mirror and in communication with an output of said photodetector, and
software adapted to be executed by said processor and thereby generate said command and facilitate measurement of said first position and said second position of said first reference beam by measuring corresponding positions of said reference spot on said surface of said photodetector; and third means for adjusting said command via said scale factor so that said second position matches said first position, said scale factor being an initial scale factor and said software being adapted to receive input from an image tracker in communication with an imaging sensor, said imaging sensor rigidly aligned to said reference source and aimed at a calibration target, said input representing a change in angular position of an image of said target in response to said command.

17. The system of claim 16 wherein said software includes a module for adjusting said scale factor based on said variation in angular position of said image, said variation corresponding to a difference in angular position between said first position and said second position.

18. The system of claim 17 wherein said module implements the following equation:

$$(K \text{ Cal Error Comp})_t = (K \text{ Cal Error Comp})_{t-1}(\Delta_{X,Y\,t}/\theta_{CDP}),$$

where $(K \text{ Cal Error Comp})_t$ is said scale factor at time t; $(K \text{ Cal Error Comp})_{t-1}$ is said scale factor at time t−1; $\Delta_{X,Y\,t}/\theta_{CDP}$ is a scale factor correction term based on said variation in angular position, where $\Delta_{X,Y\,t}$ is the difference between a null position and a resulting position of a line-of-sight of a sensor corresponding to said second position; and $\theta_{CDP}$ represents said command corresponding to said first position.

* * * * *

UNITED STATES PATENT AND TRADEMARK OFFICE
CERTIFICATE OF CORRECTION

PATENT NO.    : 6,792,369 B2
DATED         : September 14, 2004
INVENTOR(S)   : Peter V. Messina It is certified that error appears in the above-identified patent and that said Letters Patent is hereby corrected as shown below:

Column 1,
Line 5, insert the following:
-- This invention was made with Government support under contract N00019-97-C-0009 awarded by the Department of the Navy. The government has certain rights in this invention. --

Signed and Sealed this

Eighteenth Day of January, 2005

JON W. DUDAS
*Director of the United States Patent and Trademark Office*